United States Patent
Yang (10) Patent No.: US 10,425,118 B2
(45) Date of Patent: Sep. 24, 2019

(54) MOBILE DEVICE-CENTRIC ELECTRONIC SUBSCRIBER IDENTITY MODULE (ESIM) PROVISIONING

(71) Applicant: Apple Inc., Cupertino, CA (US)

(72) Inventor: Xiangying Yang, Cupertino, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 15/073,426

(22) Filed: Mar. 17, 2016

(65) Prior Publication Data

US 2016/0277051 A1    Sep. 22, 2016

Related U.S. Application Data (60) Provisional application No. 62/136,386, filed on Mar. 20, 2015.

(51) Int. Cl.
*H04B 1/38*        (2015.01)
*H04B 1/3816*      (2015.01)
(Continued)

(52) U.S. Cl.
CPC ....... *H04B 1/3816* (2013.01); *H04L 41/0806* (2013.01); *H04L 63/08* (2013.01); *H04W 12/04031* (2019.01)

(58) Field of Classification Search
CPC ... H04B 1/3816; H04L 41/0806; H04L 63/08; H04W 12/04; H04W 12/06; H04W 12/70;
(Continued)

(56) References Cited

U.S. PATENT DOCUMENTS

| 7,628,322 B2 | 12/2009 | Holtmanns et al. |
| 8,649,765 B1 * | 2/2014 | Hjelm ................ H04L 63/0861 455/410 |

(Continued)

FOREIGN PATENT DOCUMENTS

| CN | 101164086 A | 4/2008 |
| CN | 103748906 A | 4/2014 |
| EP | 2889799 A1 * | 7/2015 ............. G06F 21/57 |

OTHER PUBLICATIONS

Technical Specification: ETSI TS 102225 v12.1.0 (2014-10), "Smart Cards; Secured packet structure for UICC based applications," (Release 12).
(Continued)

*Primary Examiner* — Junpeng Chen
(74) *Attorney, Agent, or Firm* — Dickinson Wright RLLP (57) ABSTRACT

The embodiments set forth techniques for enabling mobile devices to trigger an electronic Subscriber Identity Module (eSIM) provisioning process. In some embodiments, a main operating system (OS) of the mobile device communicates a provisioning command to an embedded Universal Integrated Circuit Card (eUICC) included in the mobile device. In turn, the provisioning command causes the eUICC to establish a secure channel with a provisioning server. The provisioning command can include, for example, a network address (e.g., a uniform resource locator (URL), Internet Protocol (IP) address, etc.) associated with the provisioning server, an indication of a security protocol to be used for the secure channel, and/or other information. Using this information, the eUICC establishes the secure channel with the provisioning server, whereupon the provisioning server can provision the eSIM to the eUICC over the secure channel.

20 Claims, 5 Drawing Sheets

(51) Int. Cl.
  *H04L 12/24* (2006.01)
  *H04L 29/06* (2006.01)
  *H04W 12/04* (2009.01)

(58) Field of Classification Search
  CPC ..... H04W 8/205; H04W 8/183; H04W 72/04; H04M 1/72583
  See application file for complete search history.

(56) References Cited

U.S. PATENT DOCUMENTS

| | | | | |
|---|---|---|---|---|
| 2012/0260095 | A1* | 10/2012 | Von Hauck | H04L 9/3228 |
| | | | | 713/176 |
| 2013/0122864 | A1* | 5/2013 | Haggerty | H04L 63/105 |
| | | | | 455/411 |
| 2013/0157673 | A1* | 6/2013 | Brusilovsky | H04W 4/70 |
| | | | | 455/450 |
| 2013/0205390 | A1* | 8/2013 | Hauck | H04L 63/1408 |
| | | | | 726/22 |
| 2013/0310001 | A1* | 11/2013 | Midkiff | H04W 12/06 |
| | | | | 455/411 |
| 2013/0340059 | A1* | 12/2013 | Christopher | H04W 12/04 |
| | | | | 726/7 |
| 2014/0004827 | A1* | 1/2014 | O'Leary | H04W 8/22 |
| | | | | 455/411 |
| 2014/0220952 | A1 | 8/2014 | Holtmanns et al. | |
| 2015/0289137 | A1* | 10/2015 | Yang | H04B 1/3816 |
| | | | | 455/411 |
| 2016/0330196 | A1* | 11/2016 | El Marouani | G06F 21/57 |
| 2017/0006464 | A1* | 1/2017 | Roussel | H04W 8/18 |

OTHER PUBLICATIONS

Technical Specification: ETSI TS 102226 v12.0.0 (2015-02), "Smart Cards; Remote APDU structure for UICC based applications," (Release 12).

Chinese Application for Invention No. 201610308703.X—First Office Action dated Feb. 2, 2019.

* cited by examiner

MOBILE DEVICE-CENTRIC ELECTRONIC SUBSCRIBER IDENTITY MODULE (ESIM) PROVISIONING

CROSS-REFERENCE TO RELATED APPLICATIONS

This Application claims the benefit of U.S. Provisional Application No. 62/136,386, entitled "MOBILE DEVICE-CENTRIC ELECTRONIC SUBSCRIBER IDENTITY MODULE (ESIM) PROVISIONING", filed Mar. 20, 2015, the contents of which is incorporated by reference herein in its entirety for all purposes.

FIELD

The described embodiments set forth techniques for provisioning electronic Subscriber Identity Modules (eSIMs) to embedded Universal Integrated Circuit Cards (eUICCs) included in mobile devices.

BACKGROUND

Many mobile devices are configured to utilize Universal Integrated Circuit Cards (UICCs) that enable the mobile devices to access services provided by Mobile Network Operators (MNOs). In particular, each UICC includes at least a microprocessor and a read-only memory (ROM), where the ROM is configured to store an MNO profile that a mobile device can utilize to register and interact with an MNO. Typically, a UICC takes the form of a small removable card (commonly referred to as a Subscriber Identity Module (SIM) card) that is configured to be inserted into a UICC-receiving bay included in a mobile device. In more recent implementations, however, UICCs are being embedded directly into system boards of mobile devices. These embedded UICCs (eUICCs) can provide advantages over traditional SIM cards, e.g., an eUICC can store a number of MNO profiles—referred to herein as electronic Subscriber Identity Modules (eSIMs)—and can eliminate the need to include UICC-receiving bays in mobile devices. Moreover, eSIMs can be remotely provisioned to mobile devices, which can substantially increase flexibility when users travel to different countries, migrate their phone numbers to different MNOs, and the like.

Presently, a common approach for provisioning eSIMs to mobile devices is MNO-centric, and first involves an MNO identifying a target mobile device to which an eSIM is to be provisioned. Next, the MNO issues a provisioning request to a provisioning server that manages eSIMs, where, in turn, the provisioning server issues a command, e.g., via a secure short message service (SMS) bearer, to the target mobile device. The command causes an eUICC within the target mobile device to initiate establishment of an over-the-air (OTA) secure channel, e.g., using existing GlobalPlatform® secure channel protocols. When the OTA secure channel is established between the provisioning server and the eUICC of the target mobile device, the provisioning server can remotely provision an appropriate eSIM to the eUICC included in the target mobile device using the OTA secure channel.

Notably, the foregoing MNO-centric provisioning technique can have a number of drawbacks. One drawback, for example, is that MNOs may not be privy to appropriate times at which to initiate and carry out an eSIM provisioning process. For example, certain services may require a customer sign-up process to be completed, and the MNO may not be aware that an eSIM provisioning process should take place to enable the customer to access the services. Another drawback is that even when a customer has agreed to subscribe to a particular feature (e.g., via a customer service phone call), the customer may be required to provide, to the MNO, detailed information associated with his or her mobile device (e.g., an identification (ID) of the mobile device, an ID of the eUICC, etc.) so that the customer's mobile device can be properly targeted for eSIM provisioning. This additional requirement can be burdensome to the customer and create confusion, which degrades the customer's overall user experience. Moreover, handling customer service phone calls and managing device information can be cumbersome for the MNO.

SUMMARY

The embodiments set forth techniques for enabling mobile devices to trigger an electronic Subscriber Identity Module (eSIM) provisioning process. According to some embodiments, a main operating system (OS) of the mobile device communicates a provisioning command to an embedded Universal Integrated Circuit Card (eUICC) included in the mobile device. In turn, the provisioning command causes the eUICC to establish a secure channel with a provisioning server. The provisioning command can include a network address (e.g., a uniform resource locator (URL), Internet Protocol (IP) address, etc.) associated with the provisioning server, an indication of a security protocol to be used for the secure channel, and/or other information. Using information from the provisioning command, the eUICC establishes the secure channel with the provisioning server, whereupon the provisioning server can provision the eSIM to the eUICC over the established secure channel. This mobile device-centric provisioning technique provides an efficient approach for provisioning eSIMs compared with conventional, network-centric provisioning techniques, as the provisioning server does not need to be aware of when or how to contact the mobile device for provisioning purposes.

A representative embodiment sets forth a method for provisioning electronic Subscriber Identity Modules (eSIMs) to an embedded Universal Integrated Circuit Card (eUICC) included in a mobile device. The method is implemented at the eUICC, and includes the steps of (1) receiving, from the mobile device, a provisioning command, (2) issuing, in accordance with the provisioning command and to a provisioning server, a request to establish a secure channel with the provisioning server, (3) performing a mutual authentication with the provisioning server, (4) upon a successful mutual authentication, establishing the secure channel with the provisioning server, and (5) receiving provisioning information from the provisioning server over the secure channel.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Other aspects and advantages of the embodiments described herein will become apparent from the following detailed description taken in conjunction with the accompanying drawings which illustrate, by way of example, the principles of the described embodiments.

BRIEF DESCRIPTION OF THE DRAWINGS

The included drawings are for illustrative purposes and serve only to provide examples of possible structures and arrangements for the disclosed inventive apparatuses and methods for providing wireless computing devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

In accordance with various embodiments described herein, the terms "wireless communication device," "wireless device," "mobile device," "mobile station," and "user equipment" (UE) may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) Long Term Evolution (LTE), LTE Advanced (LTE-A), and/or 5G or other present or future developed advanced cellular wireless networks.

The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

Additionally, it should be understood that mobile devices described herein may be configured as multi-mode wireless communication devices that are also capable of communicating via different third generation (3G) and/or second generation (2G) RATs. In these scenarios, a multi-mode mobile device can be configured to prefer attachment to LTE networks offering faster data rate throughput, as compared to other 3G legacy networks offering lower data rate throughputs. For instance, in some implementations, a multi-mode UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

The embodiments described herein set forth techniques for enabling mobile devices to trigger an electronic Subscriber Identity Module (eSIM) provisioning process. According to some embodiments, a main operating system (OS) of the mobile device communicates a provisioning command to an embedded Universal Integrated Circuit Card (eUICC) included in the mobile device. In turn, the provisioning command causes the eUICC to establish a secure channel with a provisioning server. The provisioning command can include, for example, a network address associated with the provisioning server, an indication of a security protocol to be used for the secure channel, and/or other information. Using this information, the eUICC establishes the secure channel with the provisioning server, whereupon the provisioning server can provision the eSIM to the eUICC over the secure channel.

Accordingly, the mobile device-centric provisioning techniques described herein provide an efficient approach for provisioning eSIMs in comparison to conventional, network-centric provisioning techniques, as the provisioning server does not need to be aware of when or how to contact the mobile device for provisioning purposes. A more detailed discussion of these techniques is set forth below and described in conjunction with FIGS. 1-5, which illustrate detailed diagrams of systems and methods that can be used to implement these techniques.

Figure 1:
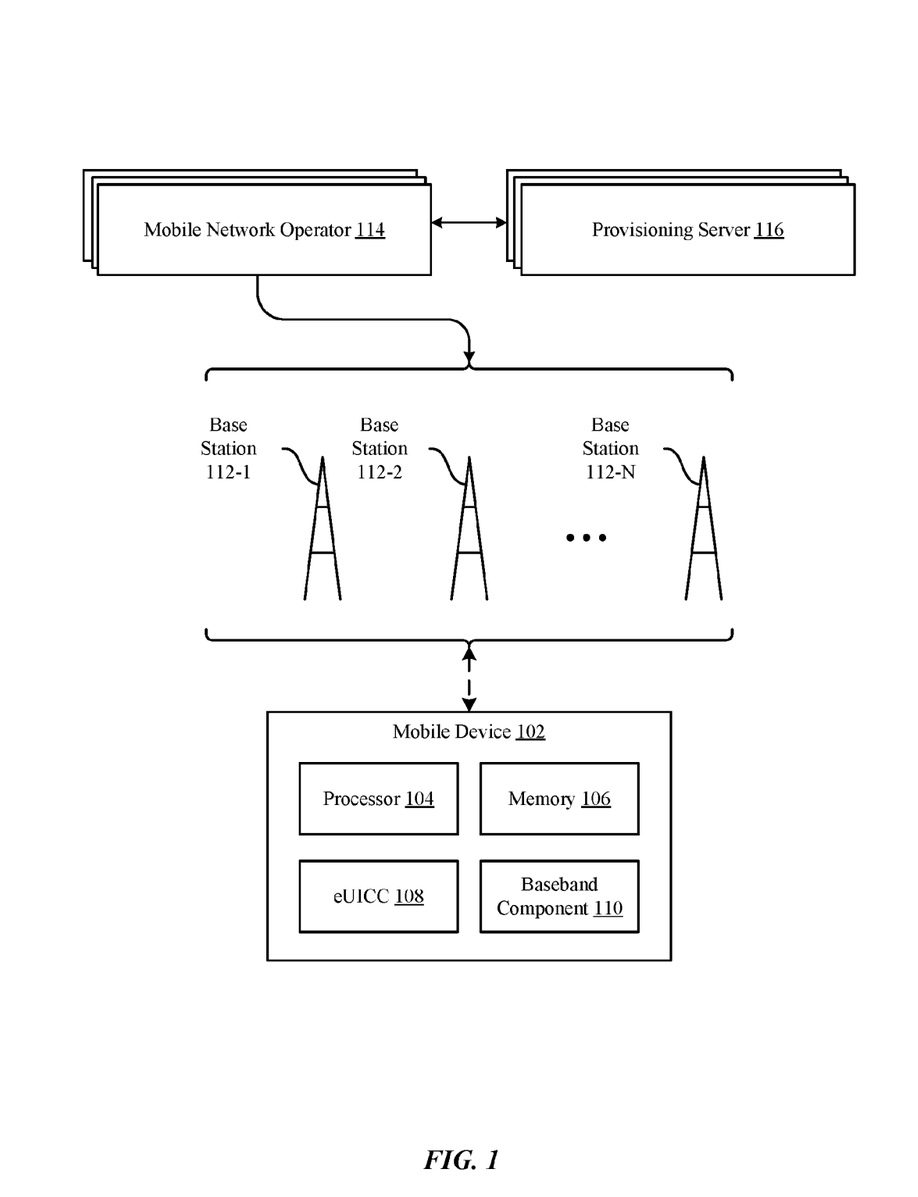
FIG. 1 illustrates a block diagram of different components of a system configured to implement the various techniques described herein, according to some embodiments.

FIG. 1 illustrates a block diagram of different components of a system 100 that is configured to implement the various techniques described herein, according to some embodiments. More specifically, FIG. 1 illustrates a high-level overview of the system 100, which, as shown, includes a mobile device 102, a group of base stations 112 that are managed by different mobile network operators (MNOs) 114, and provisioning servers 116 that are in communication with the MNOs 114. According the illustration of FIG. 1, the mobile device 102 can represent a mobile computing device (e.g., an iPhone® or an iPad® by Apple®), the base stations 112 can represent different radio towers that are configured to communicate with the mobile device 102, and the MNOs 114 can represent different wireless service providers that provide specific services (e.g., voice and data) to which the mobile device 102 can be subscribed.

As shown in FIG. 1, the mobile device 102 can include a main processor 104, a memory 106, an eUICC 108, and a baseband component 110. These components work in conjunction to enable the mobile device 102 to provide useful features to a user of the mobile device 102, such as localized computing, location based services, and Internet connectivity. As described in greater detail below, the eUICC 108 can be configured to store multiple eSIMs for accessing the different MNOs 114 through the base stations 112. For example, the eUICC 108 can be configured to store and manage an eSIM for each MNO 114 to which mobile device 102 is subscribed. To be able to access services provided by the MNOs, the eSIMs need to be provisioned to the eUICC 108. According to one approach, eSIMs can be pre-stored within the eUICC 108 in an inactive state, where the provisioning process involves the eUICC 108 obtaining MNO credentials (e.g., keys, etc.), service information (e.g., carrier information, services subscribed to), and/or other information, and using this information to activate the eSIM. According to another approach, eSIMs are not pre-stored within the eUICC 108, and the provisioning process involves the eUICC 108 obtaining the eSIMs from the provisioning servers 116. It is noted that the provisioning server 116 can be maintained by a manufacturer of the mobile device 102, the MNOs 114, third party entities, and the like. Although not illustrated in FIG. 1, the mobile device 102 can also be configured to include a receiving bay for a removable UICC (e.g., a SIM card) that can be provisioned in a similar manner using the different techniques described herein.

Figure 2:
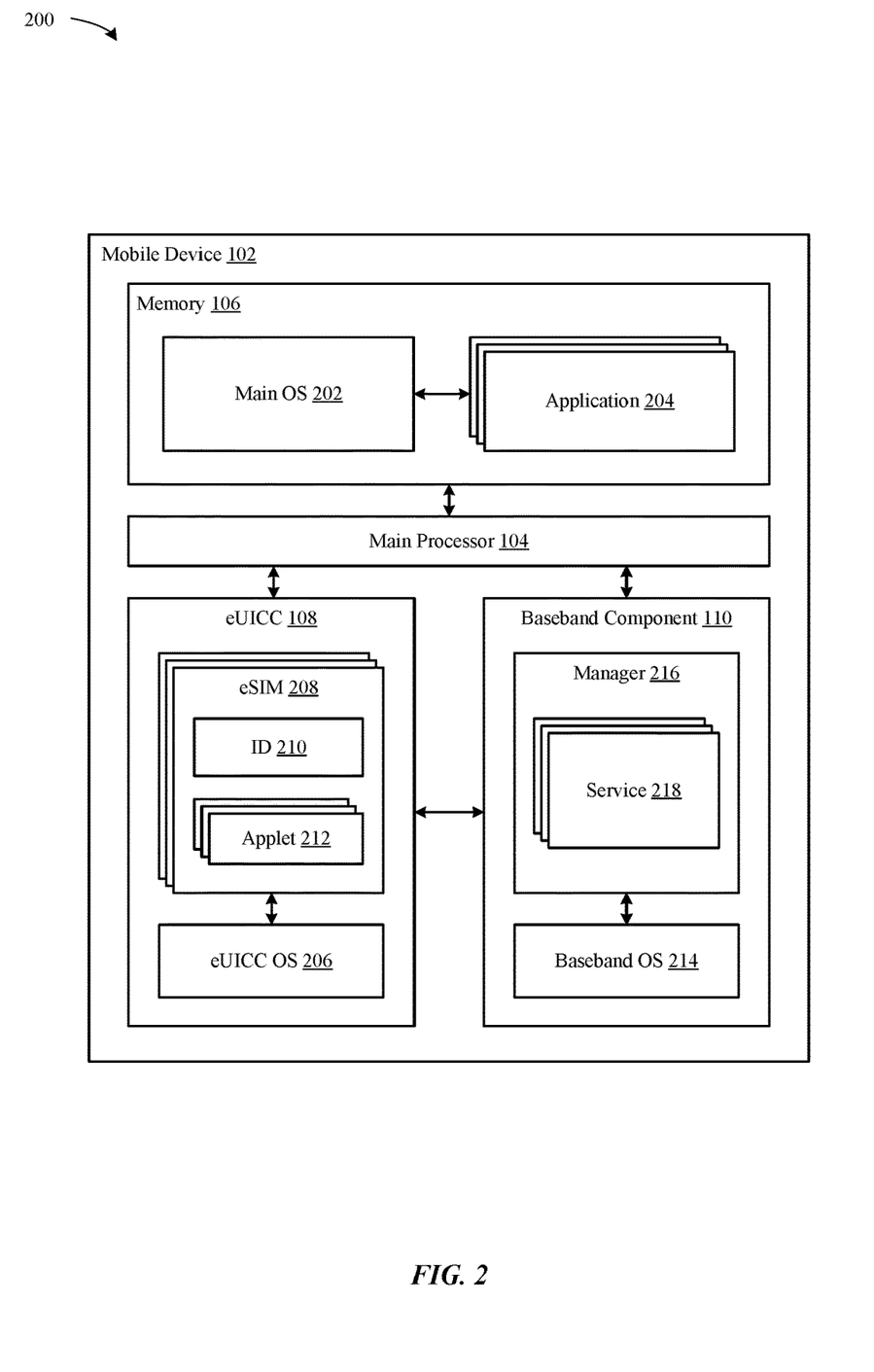
FIG. 2 illustrates a block diagram of a more detailed view of particular components of the system of FIG. 1, according to some embodiments.

FIG. 2 illustrates a block diagram of a more detailed view 200 of particular components of the mobile device 102 of FIG. 1, according to some embodiments. As shown in FIG. 2, the main processor 104, in conjunction with the memory 106, can implement a main operating system (OS) 202 that is configured to execute applications 204 (e.g., native OS applications and user applications). As also shown in FIG. 2, the eUICC 108 can be configured to implement an eUICC OS 206 that is configured to manage the hardware resources of the eUICC 108 (e.g., an embedded processor and a memory, not explicitly shown in FIG. 2). The eUICC OS 206 can also be configured to manage eSIMs 208 that are stored by the eUICC 108, e.g., by activating the eSIMs 208 within the eUICC 108 and providing the baseband component 110 with access to the eSIMs 208. According to the illustration shown in FIG. 2, each eSIM 208 can be associated with a unique identifier 210 and can include multiple applets 212 that define the manner in which the eSIM 208 operates. For example, one or more of the applets 212, when implemented by the baseband component 110 and the eUICC 108, can be configured to enable the mobile device 102 to communicate with an MNO 114 and provide useful features (e.g., phone calls and internet) to a user of the mobile device 102.

As also shown in FIG. 2, the baseband component 110 of the mobile device 102 can include a baseband OS 214 that is configured to manage the hardware resources of the baseband component 110 (e.g., a processor, a memory, different radio components, etc.). According to some embodiments, the baseband component 110 can implement a manager 216 that is configured to interface with the eUICC 108 to implement the various techniques described herein, which include establishing a secure channel with the provisioning server 116 and obtaining information from the provisioning server 116 for purposes of provisioning eSIMs 208. As also shown in FIG. 2, the manager 216 can be configured to implement services 218, which represents a collection of software modules that are instantiated by way of the various applets 212 of activated eSIMs 208 that are included in the eUICC 108. For example, services 218 can be configured to manage the different connections that exist between the mobile device 102 and the MNOs 114 according to the different eSIMs 208 that are activated within the eUICC 108.

Figure 3:
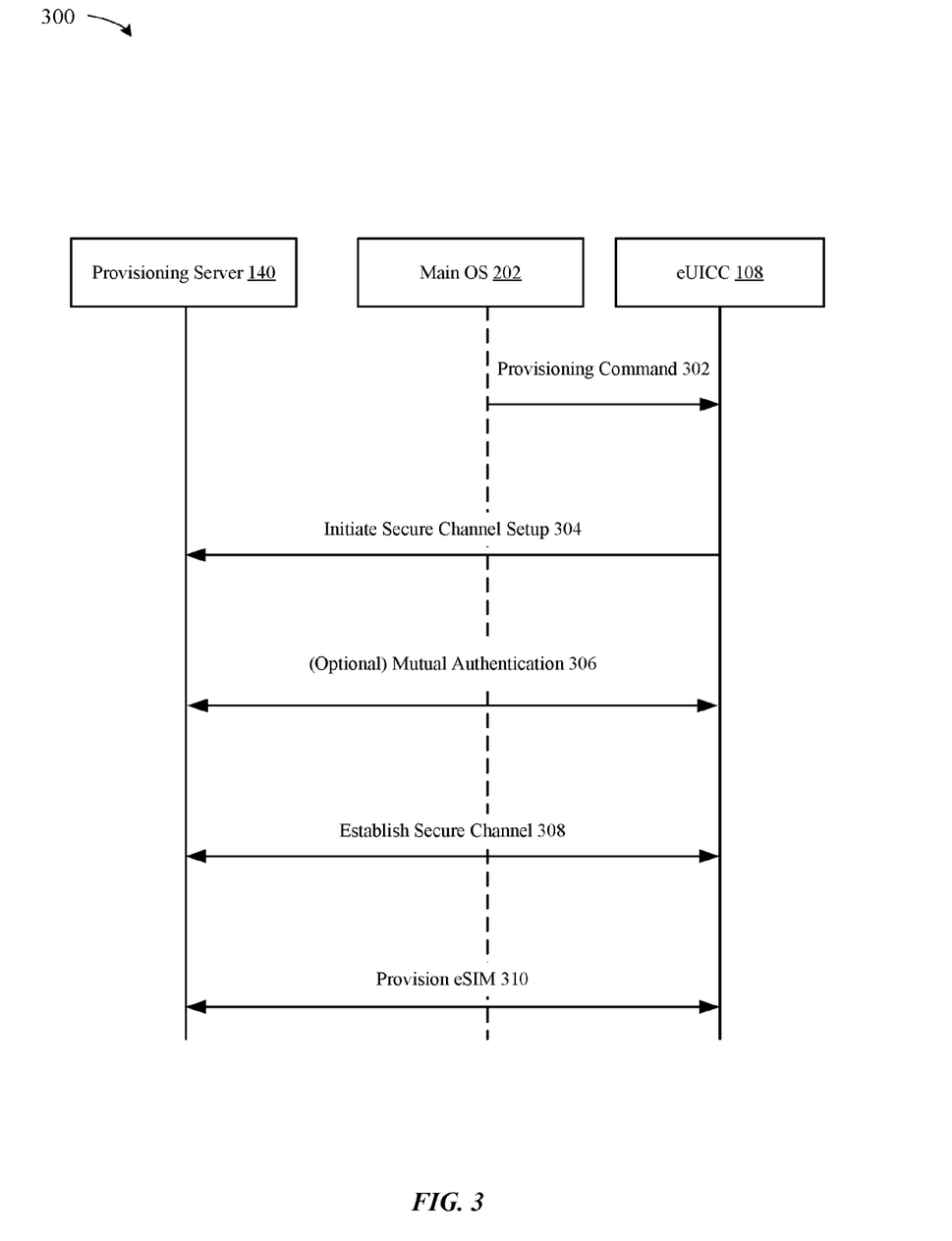
FIG. 3 illustrates a sequence diagram of a method for provisioning an eSIM for storage on an eUICC of the mobile device of FIG. 1, according to some embodiments.

FIG. 3 illustrates a sequence diagram of a method 300 for enabling the mobile device 102 of FIG. 1 to initiate an eSIM 208 provisioning process, according to some embodiments. As shown in FIG. 3, at an operation 302, the mobile device 102 communicates a provisioning command to eUICC 108 to initiate the eSIM 208 provisioning process. According to some embodiments, the main OS 202 of the mobile device 102 communicates the provisioning command to the eUICC 108. Other embodiments, however, can involve different components within the mobile device 102—such as applications 204, the manager 216 of the baseband component 110, etc.—communicating the provisioning command to the eUICC 108.

According to some embodiments, the provisioning command is authenticated within the mobile device 102 through use of credentials (e.g., security certificates) that are provided by secure/trusted components included in the mobile device 102. For example, the provisioning command can be authenticated when a user of the mobile device 102 provides a fingerprint via a fingerprint scanner included on the mobile device 102. This beneficially can enable the eUICC 108 to trust, at least to a reliable degree, that the provisioning command is valid, and can help suppress provisioning commands from being inappropriately issued (e.g., if malicious software is executing on the mobile device 102).

In some embodiments, the provisioning command takes the form of an application protocol data unit (APDU) command. See, for example, the ISO/IEC 7816-4 standard for example structures of the APDU command. The provisioning command can include a network address associated with the provisioning server 116 (e.g., a URL, an IP address, etc.), an indication of a security protocol (e.g., public key infrastructure (PKI)-based protocols, symmetric cryptography protocols, etc.) that should be used to set up a secure channel between the eUICC 108 and the provisioning server 116, among other information. In some embodiments, the main OS 202 can trigger the provisioning command periodically, in response to a user request, in response to a request issued by a software or hardware entity included in the mobile device 102, in response to a contextual event, and the like. For example, the main OS 202 can trigger the provisioning command in response to the mobile device 102 entering into a particular geographical area. For example, when the mobile device 102 is within a particular geographical area, the main OS 202 can (i) identify a network address of a provisioning server 116 that is located within the particular geographical area, and (ii) identify different security protocols supported by the provisioning server 116. The main OS 202 can also select a security protocol to be used when establishing a secure channel with the provisioning server 116. For example, the main OS 202 can select a security protocol that is supported by the eUICC 108 and the provisioning server 116. Upon identifying this information, the main OS 202 can generate a provisioning command in accordance with the identified network address and security protocols, and issue the provisioning command to the provisioning server 116.

In some implementations, security keys associated with the security protocol can be pre-configured into the eUICC 108. In some cases, when the mobile device 102 is manufactured, the geographical area where the mobile device 102 will be used (and hence the network address of the provisioning server 116) is unknown. Thus, pre-configuring the eUICC 108 with the network address of the provisioning server 116 and symmetric security keys associated with the provisioning server 116 becomes difficult. However, in these cases, the main OS 202 can obtain/establish the network address and security protocol indication for the provisioning command using the techniques described above.

Referring back to FIG. 3, at an operation 304, the eUICC 108 initiates a secure channel setup with the provisioning server 116 in response to receiving the provisioning command. In some embodiments, the eUICC 108 initiates the secure channel setup in accordance with the information (e.g., the network address and security protocol) set forth by the provisioning command. For example, the eUICC 108 can initiate the secure channel setup via an "OPEN CHANNEL" command that includes a list of parameters for establishing the secure channel. Specifically, the list of parameters can include, for example, the network address of the provisioning server 116 (e.g., a URL) and a connection mode for the secure channel (e.g., Transmission Control Protocol (TCP) client mode). The eUICC 108 can then establish the secure channel using, for example, a Bearer Independent Protocol (BIP) communication channel.

In some embodiments, at an optional operation 306, a scalable PKI-based protocol (or any asymmetric cryptography protocol) can used for mutual authentication of the eUICC 108 and the provisioning server 116 prior to establishing the secure channel. Typically, existing GlobalPlatform® and European Telecommunications Standards Institute (ETSI) specifications rely on pre-shared symmetric keys (as used in symmetric cryptography protocols, e.g., Pre-shared key-Transport Layer Security (PSK-TLS)) for setting up a secure channel. While pre-shared symmetric keys can be used for establishing the secure channel between the eUICC 108 and provisioning server 116, pre-configuring the eUICC 108 and provisioning server 116 with the symmetric keys can be burdensome. Specifically, during manufacturing of the eUICC 108/mobile device 102, it can be difficult to predict the provisioning server 116 that the mobile device 102 will use for eSIM 208 provisioning purposes. Thus, by using PKI-based protocols for authentication where the security keys can be created on-the-fly/on-demand, additional flexibility in establishing the secure channel can be achieved. Examples of PKI-based security protocols include, but are not limited to, TLS—Diffie-Hellman (TLS-DH) and TLS—Ephemeral Diffie-Hellman (TLS-DHE) protocols that provide forward secrecy, an Elliptic Curve Cryptography (ECC) protocol, Ron Rivest, Adi Shamir and Leonard Adleman (RSA) protocols, and the like. It will be understood, however, that symmetric cryptography protocols that rely on symmetric keys that are pre-shared between the eUICC 108 and the provisioning server 116 can be used for the mutual authentication without departing from the scope of this disclosure.

In some embodiments, the security protocol chosen for the provisioning command can indicate that the eUICC 108 should use a certificate-based authentication and key agreement (AKA) protocol for mutual authentication between the eUICC 108 and the provisioning server 116. For example, when the ECC protocol is used, an Elliptic Curve Cryptography Agreement Algorithm (ECKA) can be used to generate security keys. In some implementations, existing symmetric cryptography protocols can be used with the generated keys, however, a PKI-based key agreement would first be performed.

Referring back to FIG. 3, at the optional operation 306, the eUICC 108 and the provisioning server 116 can mutually authenticate one another based on an exchange of security keys using the foregoing PKI-based security techniques. When a mutual authentication is successfully accomplished, at an operation 308, the secure channel is established between the eUICC 108 and the provisioning server 116. Alternatively, when the optional operation 306 is not carried out, the secure channel is established at the operation 308 in response to the request to initiate the secure channel setup (issued by the eUICC 108 at the operation 304). In some embodiments, a Hypertext Transfer Protocol Secure (HTTPS)-based secure communication channel can be established directly between the eUICC 108 and the provisioning server 116. Finally, at an operation 310, the provisioning server 116 uses the established secure channel to communicate provisioning information (e.g., MNO 114 credentials, eSIMs 208, etc.) to the eUICC 108. The provisioning information can then be used by the eUICC 108 to provision eSIMs 208 within the mobile device 102.

Accordingly, a mobile device 102-initiated provisioning command can trigger the eUICC 108 to establish a secure channel with a provisioning server 116, whereupon provisioning information can be communicated to the eUICC 108 using the secure channel. Thus, after initiating the provisioning command, the mobile device 102/main OS 202 is not involved in the secure channel setup and is not privy to the provisioning information (e.g., security keys, provisioning information, etc.) that is exchanged between the eUICC 108 and the provisioning server 116. Moreover, a HTTP/TCP/IP session (with no additional security) exists between the mobile device 102 and the provisioning server 116, while a secure HTTPS-based session exists directly between the eUICC 108 and the provisioning server 116.

Figure 4:
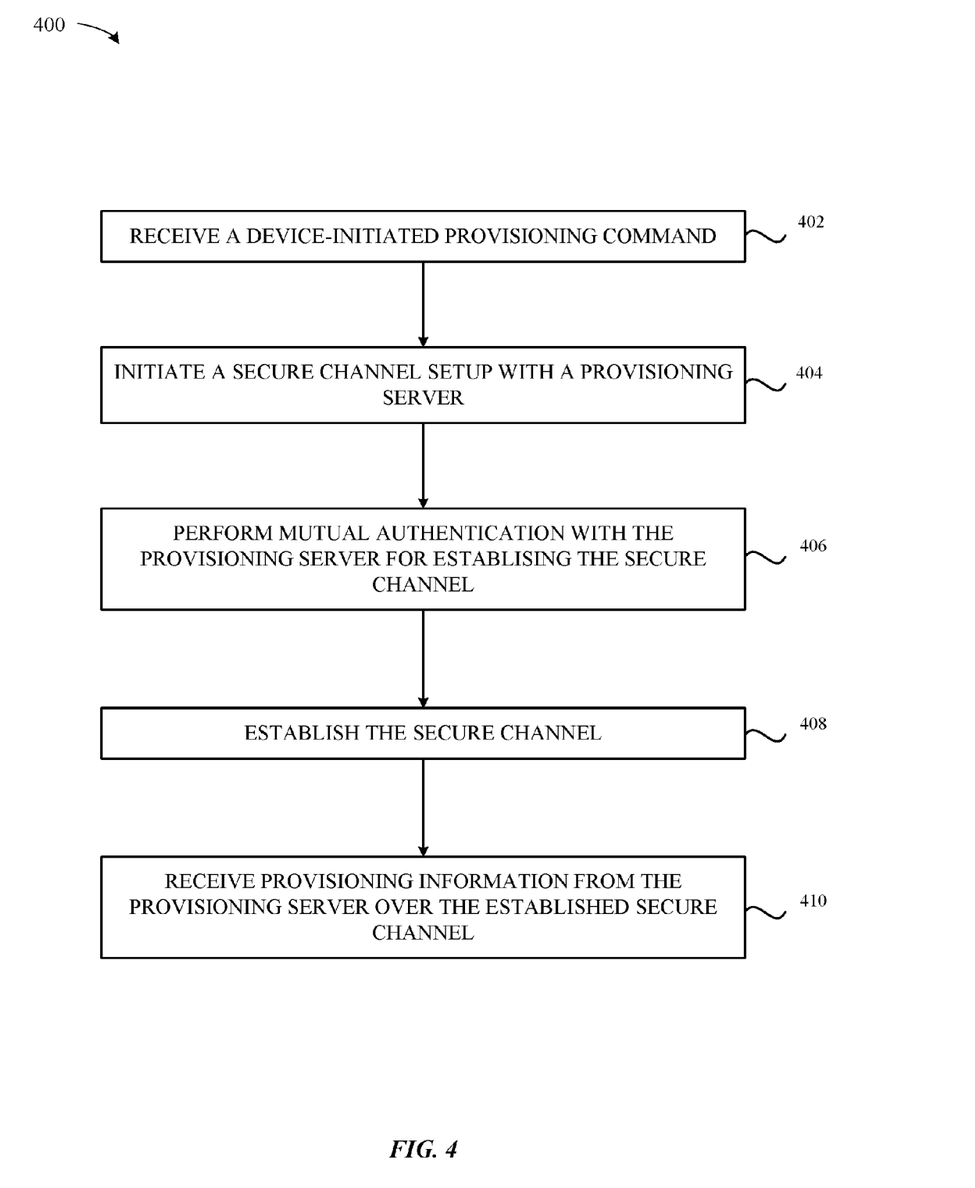
FIG. 4 illustrates a flowchart of an example method for provisioning an eSIM for storage on the eUICC of the mobile device of FIG. 1, according to some embodiments.

FIG. 4 illustrates a flowchart of a method 400 for provisioning eSIMs 208 in association with the eUICC 108 included in the mobile device 102 of FIG. 1. As shown in FIG. 4, the method 400 begins at step 402, where the eUICC 108 receives a mobile device 102-initiated provisioning command. Specifically, and as previously described herein, the provisioning command can be generated by the main OS 202 executing on the mobile device 102, and causes the eUICC 108 to set up a secure channel setup with a provisioning server 116. According to some embodiments, the provisioning command includes a network address associated with the provisioning server 116 and an indication of a security protocol to be used to set up the secure channel.

At step 404, the eUICC 108 sets up a secure channel with the provisioning server 116 using the information included in the provisioning command. At step 406, the eUICC 108 (optionally) carries out a mutual authentication with the provisioning server 116. For example, the eUICC 108 can use PKI-based security protocols to perform the mutual authentication. At step 408, the eUICC 108 establishes the secure channel (e.g., HTTPS-based secure channel) with the provisioning server 116. Finally, at step 410, the eUICC 108 receives provisioning information from the provisioning server 116 over the established secure channel.

Accordingly, the mobile device 102-initiated provisioning approach described herein provides various benefits over conventional approaches. For example, this approach 1) enables existing OTA specifications to be used for managing eUICCs, 2) does not require card vendors to carry out substantial OS changes when moving from UICC-based devices to eUICC-based devices, 3) allows MNOs and card vendors to reuse existing network infrastructure for remote provisioning platforms, 4) reduces dependency on legacy SMS bearer and symmetric cryptography protocols that are required for network-initiated provisioning techniques, and 5) allows use of scalable PKI-based security frameworks (thereby enhancing security).

Figure 5:
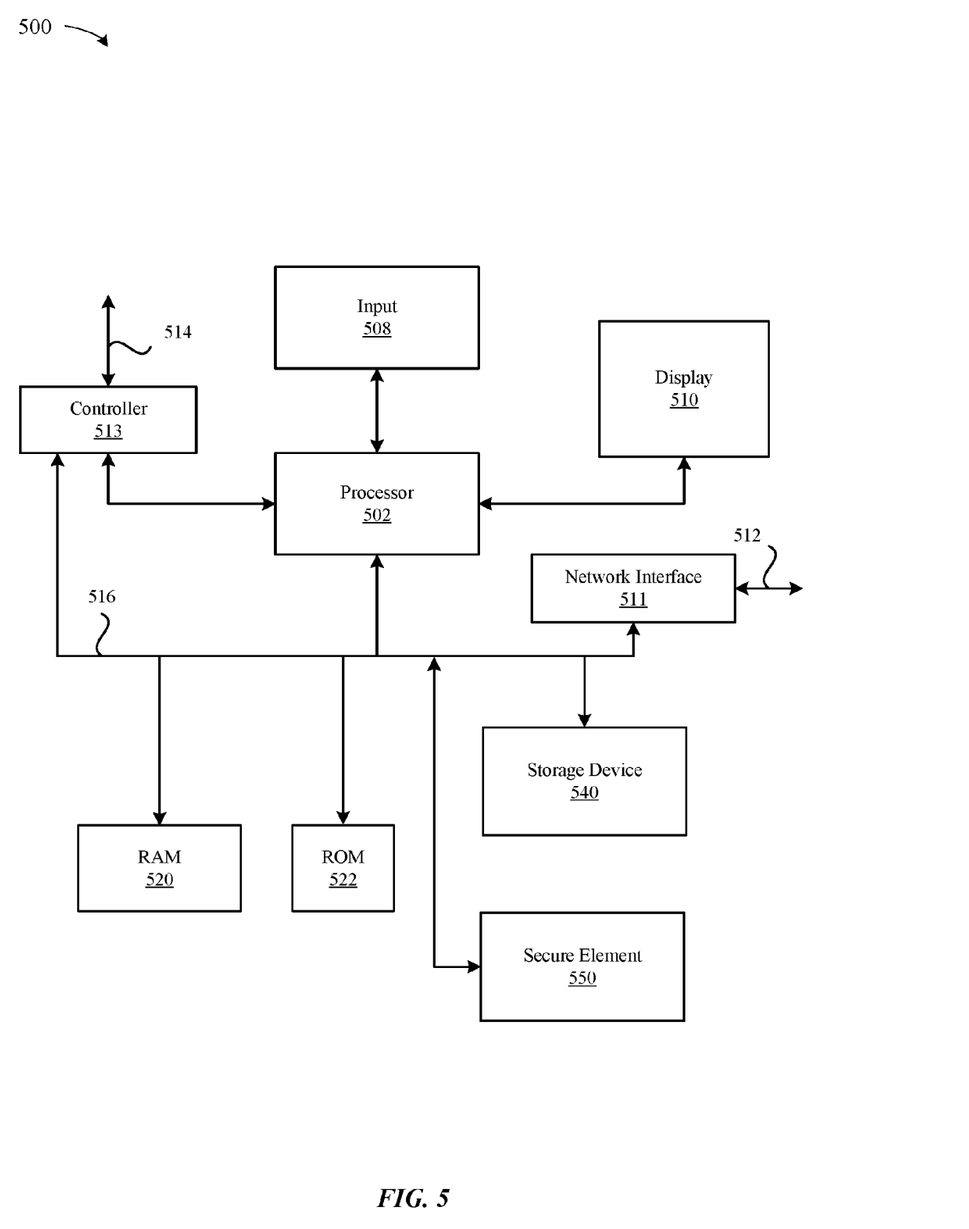
FIG. 5 illustrates a detailed view of an example computing device that can be used to implement the various components described herein, according to some embodiments.

FIG. 5 illustrates a detailed view of a computing device 500 that can be used to implement the various components described herein, according to some embodiments. In particular, the detailed view illustrates various components that can be included in the mobile device 102 illustrated in FIG. 1. As shown in FIG. 5, the computing device 500 can include a processor 502 that represents a microprocessor or controller for controlling the overall operation of computing device 500. The computing device 500 can also include a user input device 508 that allows a user of the computing device 500 to interact with the computing device 500. For example, the user input device 508 can take a variety of forms, such as a button, keypad, dial, touch screen, audio input interface, visual/image capture input interface, input in the form of sensor data, etc. Still further, the computing device 500 can include a display 510 (screen display) that can be controlled by the processor 502 to display information to the user. A data bus 516 can facilitate data transfer between at least a storage device 540, the processor 502, and a controller 513. The controller 513 can be used to interface with and control different equipment through and equipment control bus 514. The computing device 500 can also include a network/bus interface 511 that couples to a data link 512. In the case of a wireless connection, the network/bus interface 511 can include a wireless transceiver.

The computing device 500 also include a storage device 540, which can comprise a single disk or a plurality of disks (e.g., hard drives), and includes a storage management module that manages one or more partitions within the storage device 540. In some embodiments, storage device 540 can include flash memory, semiconductor (solid state) memory or the like. The computing device 500 can also include a Random Access Memory (RAM) 520 and a Read-Only Memory (ROM) 522. The ROM 522 can store programs, utilities or processes to be executed in a non-volatile manner. The RAM 520 can provide volatile data storage, and stores instructions related to the operation of the computing device 500. The computing device 500 can further include a secure element 550, which can represent the eUICC 108 illustrated in FIGS. 1-2 and described in detail herein.

In some embodiments, a method for provisioning electronic Subscriber Identity Modules (eSIMs) to an embedded Universal Integrated Circuit Card (eUICC) included in a mobile device includes one or more steps as follows performed at the eUICC. The eUICC receives from a main processor of the mobile device, where the main processor is external to the eUICC, a provisioning command. The eUICC issues, in accordance with the provisioning command and to a provisioning server, a request to establish a secure channel with the provisioning server. The eUICC performs a mutual authentication with the provisioning server, and upon a successful mutual authentication, establishes the secure channel with the provisioning server. The eUICC subsequently receives provisioning information from the provisioning server via the secure channel.

In some embodiments, the provisioning command is generated by a main operating system (OS) executing on the main processor of the mobile device. In some embodiments, the main OS executing on the main processor of the mobile device is not involved in the setup of the secure channel. In some embodiments, the provisioning command includes a network address associated with the provisioning server. In some embodiments, the request to establish the secure channel is initiated based at least in part on the network address of the provisioning server. In some embodiments, the request to establish the secure channel is initiated by at least using an OPEN CHANNEL command. In some embodiments, the provisioning command includes an indication of a security protocol to be used for the secure channel. In some embodiments, the security protocol includes a PKI-based security protocol. In some embodiments, the mutual authentication is performed in accordance with the PKI-based security protocol.

In some embodiments, an embedded Universal Integrated Circuit Card (eUICC) is configured to support provisioning of electronic Subscriber Identity Modules (eSIMs) and includes a memory configured to store at least one eSIM, and an embedded processor configured to carry out one or more methods as described herein.

In some embodiments, a mobile device is configured to support provisioning of electronic Subscriber Identity Modules (eSIMs) and includes a main processor communicatively coupled to a memory, a baseband component configured to communicate with a wireless network via at least one antenna, and an embedded Universal Integrated Circuit Card (eUICC) that is configured to carryout one or more methods as described herein.

The various aspects, embodiments, implementations or features of the described embodiments can be used separately or in any combination. Various aspects of the described embodiments can be implemented by software, by hardware, or by a combination of hardware and software. The described embodiments can also be embodied as computer readable code on a computer readable medium. The computer readable medium is any data storage device that can store data, which can thereafter be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for enabling a mobile device to participate in a provisioning procedure with a provisioning server, the method comprising, at an embedded Universal Integrated Circuit Card (eUICC) included in the mobile device:
   receiving, from a main processor of the mobile device external to the eUICC, a provisioning command, wherein the provisioning command includes provisioning server information obtained by the main processor from the provisioning server using a first communications channel that is accessible to the main processor;
   receiving an authorization credential from a secure component included in the mobile device, wherein the authorization credential authenticates the provisioning command and is received in conjunction with the provisioning command; and
   in response to receiving the provisioning command and the authorization credential:
      issuing, in accordance with the provisioning command and to the provisioning server, a request to establish a second communications channel with the provisioning server,
      performing a mutual authentication with the provisioning server,
      upon a successful mutual authentication, establishing the second communications channel with the provisioning server, wherein the second communications channel is distinct from the first communications channel, and information communicated over the second communications channel is inaccessible to the main processor,
      receiving provisioning information from the provisioning server over the second communications channel, and
      activating, using the provisioning information, an inactive electronic Subscriber Identity Module (eSIM) managed by the eUICC.

2. The method of claim 1, wherein the provisioning command is generated by a main operating system (OS) executing on the main processor of the mobile device.

3. The method of claim 1, wherein the provisioning command is issued by the main processor in response to at least one predefined condition being satisfied, and the provisioning command is received in association with the at least one predefined condition being satisfied.

4. The method of claim 3, wherein the information comprises a network address associated with the provisioning server.

5. The method of claim 4, wherein the request to establish the second communications channel is initiated based at least in part on the network address of the provisioning server.

6. The method of claim 3, wherein the at least one predefined condition is satisfied when the mobile device enters into a particular geographical area.

7. The method of claim 3, wherein the information comprises an indication of a security protocol to be used for the second communications channel.

8. The method of claim 1, wherein the secure component provides the authorization credential in conjunction with receiving a biometric input from an authorized user for the mobile device.

9. The method of claim 1, wherein activating the eSIM comprises applying, to the inactive eSIM, at least one of encryption keys, service information, or service information associated with a Mobile Network Operator (MNO).

10. An embedded Universal Integrated Circuit Card (eUICC) configured to enable a mobile device to participate in a provisioning procedure with a provisioning server, the eUICC comprising:
    a memory configured to store one or more electronic Subscriber Identity Modules (eSIMs); and
    an embedded processor configured to carry out steps that include:
       receiving, from a main processor of the mobile device external to the eUICC, a provisioning command, wherein the provisioning command includes provisioning server information obtained by the main processor from the provisioning server using a first communications channel that is accessible to the main processor;
       receiving an authorization credential from a secure component included in the mobile device, wherein the authorization credential authenticates the provisioning command and is received in conjunction with the provisioning command; and
       in response to receiving the provisioning command and the authorization credential:
          issuing, in accordance with the provisioning command and to the provisioning server, a request to establish a second communications channel with the provisioning server,
          performing a mutual authentication with the provisioning server,
          upon a successful mutual authentication, establishing the second communications channel with the provisioning server, wherein the second communications channel is distinct from the first communications channel, and information communicated over the second communications channel is inaccessible to the main processor,
          receiving provisioning information from the provisioning server over the second communications channel, and
          activating, using the provisioning information, an inactive electronic Subscriber Identity Module (eSIM) managed by the eUICC.

11. The eUICC of claim 10, wherein the provisioning command is generated by a main operating system (OS) executing on the main processor of the mobile device.

12. The eUICC of claim 10, wherein the provisioning command is issued by the main processor in response to at least one predefined condition being satisfied, and the provisioning command is received in association with the at least one predefined condition being satisfied.

13. The eUICC of claim 12, wherein the information comprises a network address associated with the provisioning server.

14. The eUICC of claim 13, wherein the request to establish the second communications channel is initiated based at least in part on the network address of the provisioning server.

15. The eUICC of claim 12, wherein the at least one predefined condition is satisfied when the mobile device enters into a particular geographical area.

16. The eUICC of claim 12, wherein the information comprises an indication of a security protocol to be used for the second communications channel.

17. The eUICC of claim 10, wherein the secure component provides the authorization credential in conjunction with receiving a biometric input from an authorized user for the mobile device.

18. The eUICC of claim 10, wherein activating the inactive eSIM comprises applying, to the inactive eSIM, at least one of encryption keys, service information, or service information associated with a Mobile Network Operator (MNO).

19. A mobile device configured to participate in a provisioning procedure with a provisioning server, the mobile device comprising:
   a main processor communicatively coupled to a memory;
   a baseband component configured to communicate with a wireless network via at least one antenna; and
   an embedded Universal Integrated Circuit Card (eUICC), wherein the eUICC is configured to carry out steps that include:
      receiving, from a main processor of the mobile device external to the eUICC, a provisioning command, wherein the provisioning command includes provisioning server information obtained by the main processor from the provisioning server using a first communications channel that is accessible to the main processor;
      receiving an authorization credential from a secure component included in the mobile device, wherein the authorization credential authenticates the provisioning command and is received in conjunction with the provisioning command; and
      in response to receiving the provisioning command and the authorization credential:
         issuing, in accordance with the provisioning command and to the provisioning server, a request to establish a second communications channel with the provisioning server
         performing a mutual authentication with the provisioning server,
         upon a successful mutual authentication, establishing the second communications channel with the provisioning server, wherein the second communications channel is distinct from the first communications channel, and information communicated over the second communications channel is inaccessible to the main processor,
         receiving provisioning information from the provisioning server over the second communications channel, and
         activating, using the provisioning information, an inactive electronic Subscriber Identity Module (eSIM) managed by the eUICC.

20. The mobile device of claim 19, wherein activating the eSIM comprises applying, to the inactive eSIM, at least one of encryption keys, service information, or service information associated with a Mobile Network Operator (MNO).

* * * * *